United States Patent
Levi

(10) Patent No.: US 12,485,846 B2
(45) Date of Patent: Dec. 2, 2025

(54) VEHICULAR PEDESTRIAN PROTECTION DEVICE

(71) Applicant: Binyamin Levi, Rehovot (IL)

(72) Inventor: Binyamin Levi, Rehovot (IL)

(*) Notice: Subject to any disclaimer, the term of this patent is extended or adjusted under 35 U.S.C. 154(b) by 0 days.

(21) Appl. No.: 18/851,022

(22) PCT Filed: Apr. 3, 2023

(86) PCT No.: PCT/IL2023/050350
§ 371 (c)(1),
(2) Date: Sep. 25, 2024

(87) PCT Pub. No.: WO2023/199307
PCT Pub. Date: Oct. 19, 2023

(65) Prior Publication Data
US 2025/0222894 A1 Jul. 10, 2025

(30) Foreign Application Priority Data
Apr. 13, 2022 (IL) .......................................... 292249

(51) Int. Cl.
*B60R 21/36* (2011.01)
*B60R 21/34* (2011.01)

(52) U.S. Cl.
CPC ........ *B60R 21/36* (2013.01); *B60R 2021/346* (2013.01)

(58) Field of Classification Search
CPC ... B60R 21/36; B60R 2021/346; B60R 21/34; B60R 2021/343
See application file for complete search history.

(56) References Cited

U.S. PATENT DOCUMENTS

| 4,674,590 | A | 6/1987 | Krieg | |
|---|---|---|---|---|
| 5,101,927 | A | 4/1992 | Murtuza | |
| 6,467,563 | B1* | 10/2002 | Ryan | B60R 21/36 |
| | | | | 180/274 |
| 9,340,178 | B1* | 5/2016 | Khaykin | B60R 21/34 |
| 10,029,638 | B1* | 7/2018 | Lombrozo | B60R 21/0134 |
| 2004/0011756 | A1* | 1/2004 | Payne | B61F 19/06 |
| | | | | 213/220 |
| 2004/0262893 | A1* | 12/2004 | Kempf | B60R 21/34 |
| | | | | 180/274 |

(Continued)

FOREIGN PATENT DOCUMENTS

| CN | 104724044 A | 6/2015 |
|---|---|---|
| DE | 10062560 A1 | 7/2001 |

(Continued)

OTHER PUBLICATIONS

Stainless Steel Net Made to Measure with 50 mm Mesh Size;Apr. 20, 2021—https://safetynet365.com/Steel-Wire-Rope-Nets-by-the-m/Custom-made-Steel-Wire-Net-by-the-m::1151.html#horizontalTab2.*

*Primary Examiner* — Paul N Dickson
*Assistant Examiner* — Shams Dhanani
(74) *Attorney, Agent, or Firm* — Hodgson Russ LLP

(57) ABSTRACT

A vehicular pedestrian protection device comprising: a) at least one extendable impact suppression mesh adapted to be extended vertically and laterally; and b) one or more inflatable cushions anchored to said at least one extendable impact suppression mesh for rapidly deploying said at least one extendable impact suppression mesh, upon the inflation of said one or more inflatable cushions.

8 Claims, 4 Drawing Sheets

(56) References Cited

U.S. PATENT DOCUMENTS

| | | |
|---|---|---|
| 2013/0221647 A1 | 8/2013 | Ivenz et al. |
| 2018/0236859 A1* | 8/2018 | Tester ...................... B60J 11/04 |
| 2022/0220679 A1* | 7/2022 | Yu ............................. E01F 7/04 |

FOREIGN PATENT DOCUMENTS

| | | |
|---|---|---|
| DE | 10059224 A1 | 7/2002 |
| DE | 10121630 A1 | 11/2002 |
| JP | 2016165948 A | 9/2016 |

* cited by examiner

VEHICULAR PEDESTRIAN PROTECTION DEVICE

FIELD OF THE INVENTION

The present invention is in the field of automotive safety. More specifically, the invention relates to a vehicular pedestrian protection device.

BACKGROUND OF THE INVENTION

The automotive safety market provides multiple passenger safety means for epochs. In recent decades attention is also directed to automotive apparatus for protecting pedestrians in cases of vehicle-pedestrian impact events. Such apparatus includes various inflatable devices, buckling, energy-absorbing vehicle parts, etc.

Furthermore, the evolving autonomous vehicles market introduces advanced early warning devices based on various sensors, cameras, and other detection means directed to the vehicle surroundings, enabling the driver and the vehicle control/computer to respond in a timely manner in case potential impact is presently expected.

Unfortunately, the abovementioned pedestrian protection apparatus is directed to protect a secondary impact such as by a vehicle hood/bonnet and windshield (i.e., following an initial impact by the vehicle's front bumper). In many vehicle-pedestrian accident events, an impact is imminent, even if the vehicle has started braking, and hence an initial impact by the vehicle front is not sufficiently contained.

Therefore, it is an object of the present invention to provide a vehicular pedestrian protection device that is directed to suppress pedestrian impact by the vehicle's front portion.

Other objects and advantages of the invention will become apparent as the description proceeds.

SUMMARY OF THE INVENTION

A vehicular pedestrian protection device, comprising:
a) at least one extendable impact suppression mesh adapted to be extended vertically and laterally; and
b) one or more inflatable cushions anchored to said at least one extendable impact suppression mesh for rapidly deploying said at least one extendable impact suppression mesh, upon the inflation of said one or more inflatable cushions.

In one aspect, the at least one extendable impact suppression mesh is adapted to extend out from a vehicle upon receiving an actuation signal, and wherein the received actuation signal triggers the one or more inflatable cushions to inflate and to pull said at least one extendable impact suppression mesh to deploy.

In one aspect, at least one extendable impact suppression mesh comprises a plurality of hinged telescopic pillars, each of which comprises a plurality of substantially cylindrical concentric links.

In one aspect, the cylindrical concentric links are arranged in a manner that enables them to retract and extend from each other, allowing the mesh to expand both vertically and laterally in a substantially parallel plane.

In one aspect, the cylindrical concentric links are equipped with an internal electromechanical concentricity sensing arrangement configured to enable the device to detect a collision and deploy the at least one extendable impact suppression mesh automatically.

In one aspect, the arrangement comprises an electrical circuit with contacts configured to disconnect when the links become eccentric to a predetermined extent, thereby enabling the device to detect a collision and deploy the mesh automatically, providing instant protection to the pedestrian.

In one aspect, the device further comprises elastic studs adapted to interconnect two or more adjacent extendable impact suppression meshes to ensure a stable and flexible parallel formation.

In one aspect, the two or more adjacent extendable impact suppression meshes adapted to be deployed in substantially parallel planes

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

A DETAILED DESCRIPTION OF EMBODIMENTS OF THE INVENTION

The present invention relates to a vehicular pedestrian protection device constructed to suppress and possibly prevent an impact on a pedestrian by the front portion of a vehicle.

In the following detailed description, references are made to several embodiments of the present invention, examples of which are illustrated in the accompanying figures. The figures depict an embodiment of the present invention for purposes of illustration only. One skilled in the art will readily recognize from the following description that the described embodiments may be combined, alternative embodiments may be utilized, and other changes may be made without departing from the spirit or scope of the present invention described herein.

The terms "for example", "for instance", "e.g.", and "optionally", as used herein, are intended to be used to introduce non-limiting examples. While certain references are made to certain example components, other components can be used and/or the example components can be combined into fewer components and/or divided into further components.

Furthermore, the term "vehicle" may refer to various motorized vehicles in which the proposed device can be installed to suppress vehicle-pedestrian impact, regardless of the specific exemplary vehicle illustrated by the accompanying figures.

According to an embodiment of the invention, the vehicular pedestrian protection device is a sophisticated safety mechanism designed to prevent pedestrian injuries in case of a collision with a vehicle. This device is designed to be installed in the front portion of the vehicle, where it can effectively suppress the impact and minimize the risk of serious injuries.

The device is designed to be stored within a portion of the vehicle, such as within a front fender of the vehicle, where the fender's external surface is adapted to break by the deployment of the device, or within a flat external enclosure. The device can also be installed in other locations, wherever it is desired, to suppress potential vehicle-pedestrian impact. Additionally, the device can be adapted for use with other types of wheeled vehicles, such as rail-guided vehicles, with alternate automotive vehicles.

Figure 1:
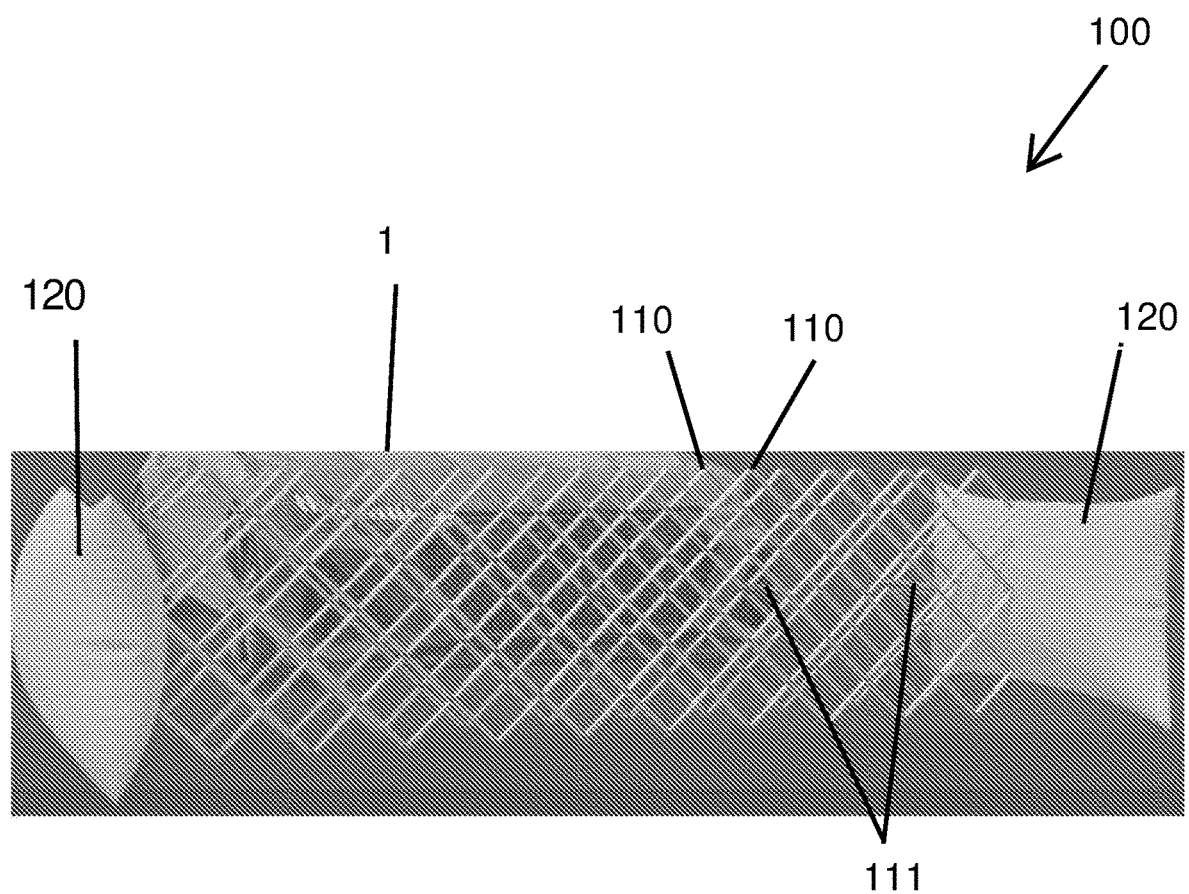
FIG. 1 shows an exemplary configuration of a vehicular pedestrian protection device, according to an embodiment of the present invention.

FIG. 1 shows a possible configuration of a vehicular pedestrian protection device 100, according to an embodiment of the present invention. Device 100 comprises several critical components that work in a coordinated manner to provide optimal protection to the pedestrian. Device 100 comprises one or more extendable impact suppression meshes 110 adapted to be extended vertically and laterally in a substantially parallel plane, forwardly, and in parallel to a vehicle front. This means that device 100 is able to provide protection to pedestrians who are hit by a vehicle from a range of different angles. The extendable meshes 110 are also able to adapt to the shape and size of the pedestrian, providing a customized level of protection depending on the individual circumstances of the collision. According to some embodiments, meshes 110 are made of a flexible and durable material that is able to withstand the forces of a collision.

In this embodiment, device 100 further comprises at least two inflatable cushions 120 anchored to the sides of extendable meshes 110, and when they are triggered to inflate, they are configured to cause the expansion of meshes 110 forwardly. For example, inflatable cushions 120 are designed to inflate extremely quickly in the same manner as an airbag of a car inflates in case of a collision. Device 110 is configured to be stored folded within a portion of a vehicle 1, such as within a front fender of vehicle 1 (or within any other suitable external enclosure of vehicle 1), where the fender's external surface is adapted to enable the deployment of device 100 by the inflation of inflatable cushions 120.

Accordingly, the primary components of device 100 are the extendable impact suppression mesh 110 and the inflatable cushions 120. Extendable impact suppression mesh 110 is designed to be stored within the vehicle in a folded position and is configured to be deployed quickly and easily in the event of a collision (e.g., can be deployed within milliseconds upon collision by the inflation of inflatable cushions 120). For example, when vehicle 1 comes into contact with a pedestrian, the external surface of the front fender of vehicle 1 is designed to break, allowing the meshes 110 of device 100 to expand and absorb the impact of the collision. As the extendable meshes 110 are deployed, they provide a cushioning effect that helps reduce the impact on the pedestrian.

Figure 2A:
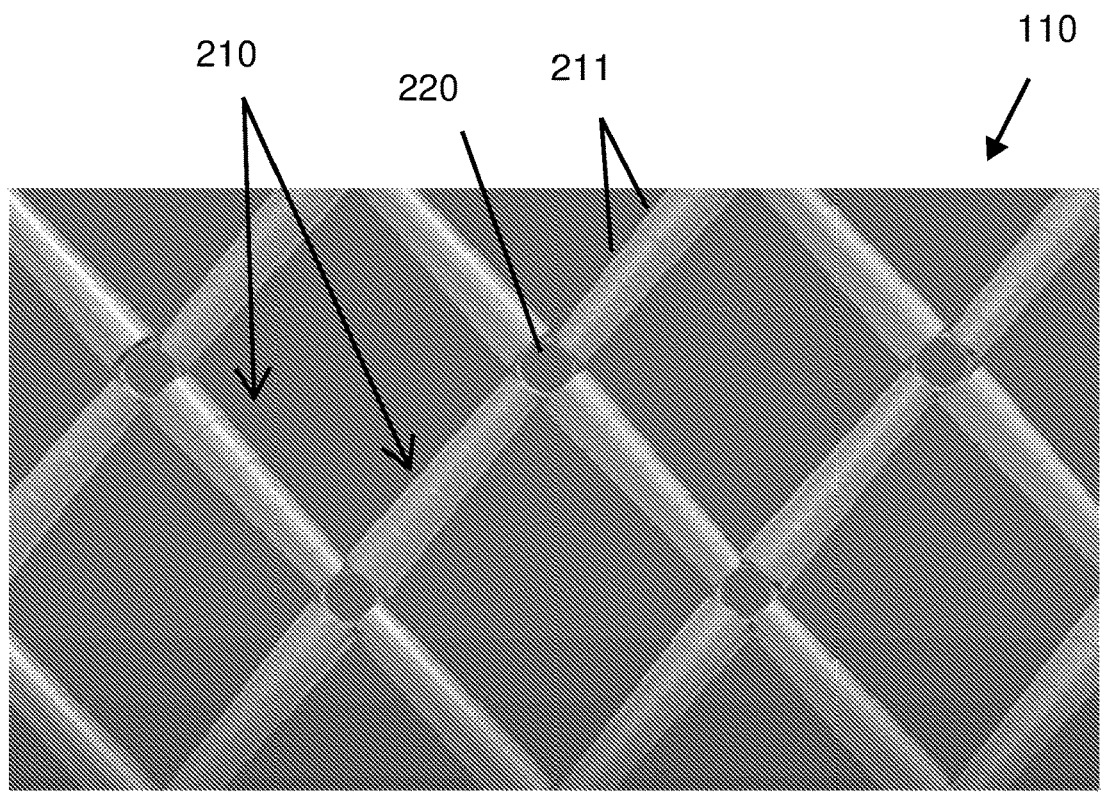
FIGS. 2A-2B shows an enlarged view of an impact suppression mesh of a vehicular pedestrian protection device, according to an embodiment of the present invention.
Figure 2B:
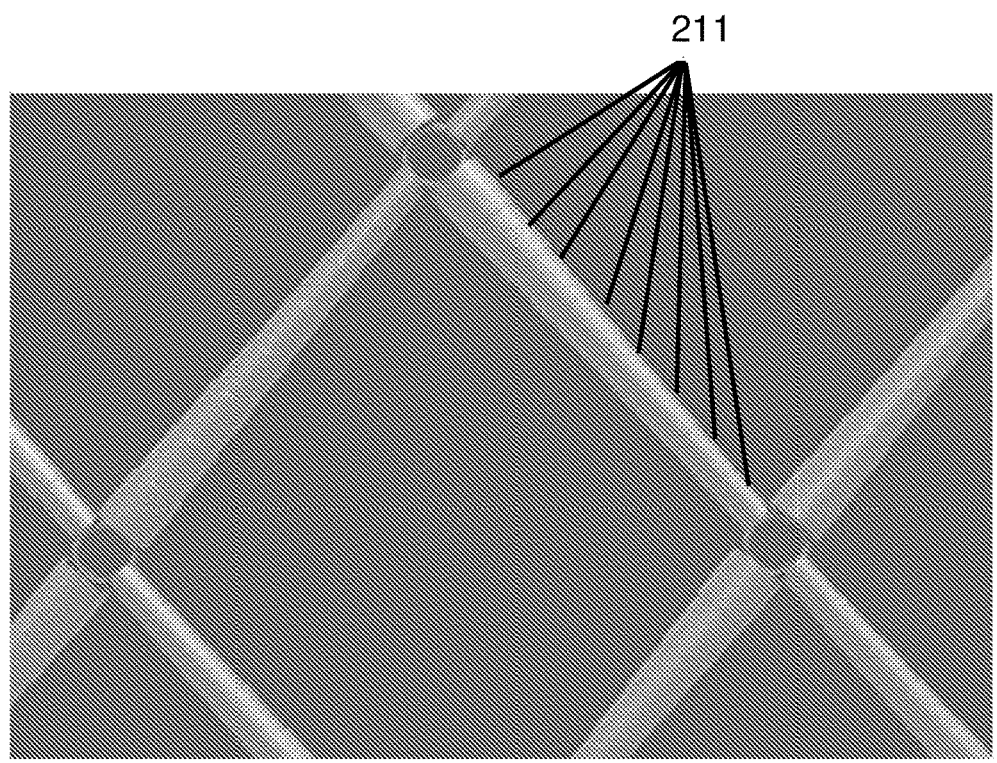

According to an embodiment of the invention, the extendable impact suppression mesh 110 is made up of telescopic pillars 210, hinged by hinges 220 (see FIGS. 2A-2B). Each pillar 210 consists of several cylindrical concentric links 211 that can be extended or retracted to adjust the size of the mesh 110. The links 211 are arranged to enable them to retract and extend from each other, allowing the mesh to expand vertically and laterally in a substantially parallel plane. Elastic studs 111 interconnect the meshes, ensuring a stable and flexible parallel formation.

Device 100 is designed to be stored within a portion of the vehicle, such as within the front fender of vehicle 1 or on top of any other external surface of vehicle 1. Device 100 can be installed/embedded within other locations of vehicle 1, wherever it is desired to suppress potential vehicle-pedestrian impact. Additionally, the device 100 can be adapted for use with other types of wheeled vehicles, such as rail-guided vehicles, with alternate automotive vehicles.

In addition to their impact suppression capabilities, the extendable meshes 110 are also designed to be easily collapsible and foldable for storage within a portion of the vehicle. This means that the device can be stored within the vehicle without taking up too much space while still being able to provide effective protection in the event of a collision.

According to an embodiment of the present invention, whereas two or more meshes 110 are employed by device 100, meshes 110 are interconnected (e.g., by elastic studs 111) to provide a flexible yet stable parallel formation thereof.

As aforementioned hereinabove, FIGS. 2A-2B shows an enlarged view of impact suppression mesh 110, according to an embodiment of the present invention. Mesh 110 comprises telescopic pillars 210, hinged by hinges 220, where each telescopic pillar 210 comprises a plurality of substantially cylindrical concentric links 211, adapted to retract/extend in/out from each other.

For example, the described structure enables mesh 110 to be stored folded in low-volume formation. When triggered, it simultaneously extends in both lateral and vertical directions, e.g., when pulled from two or more of its extremities (i.e., when rapidly deployed by one or more of the inflatable cushions 120).

According to an embodiment of the invention, to ensure the effectiveness of device 100, links 211 comprises an internal electromechanical concentricity sensing arrangement. For instance, this arrangement comprises an electrical circuit with contacts that are configured to disconnect when links 211 become eccentric to a predetermined extent (e.g., 10 degrees). This arrangement enables device 100 to detect a collision and deploy the mesh 110 automatically, providing instant protection to the pedestrian. For example, device 100 may include a transmitter (not shown) that submits a signal to the vehicular controls. Following the deployment of device 100, an object impacts mesh 110, forcing links 211 into eccentricity. This triggers the internal electromechanical sensing arrangement, causing device 100 to inflate and extend the impact suppression meshes 110 to protect the pedestrian from the collision.

For example, whereas a vehicular detection device detects a risk of pedestrian impact and actuates device 100 to deploy, and eventually the detected pedestrian engages with mesh 110 of device 100, the vehicular controls receive from a transmitter of device 100 an impact detection signal, and actuates or intensify the vehicle braking system.

Figure 3A:
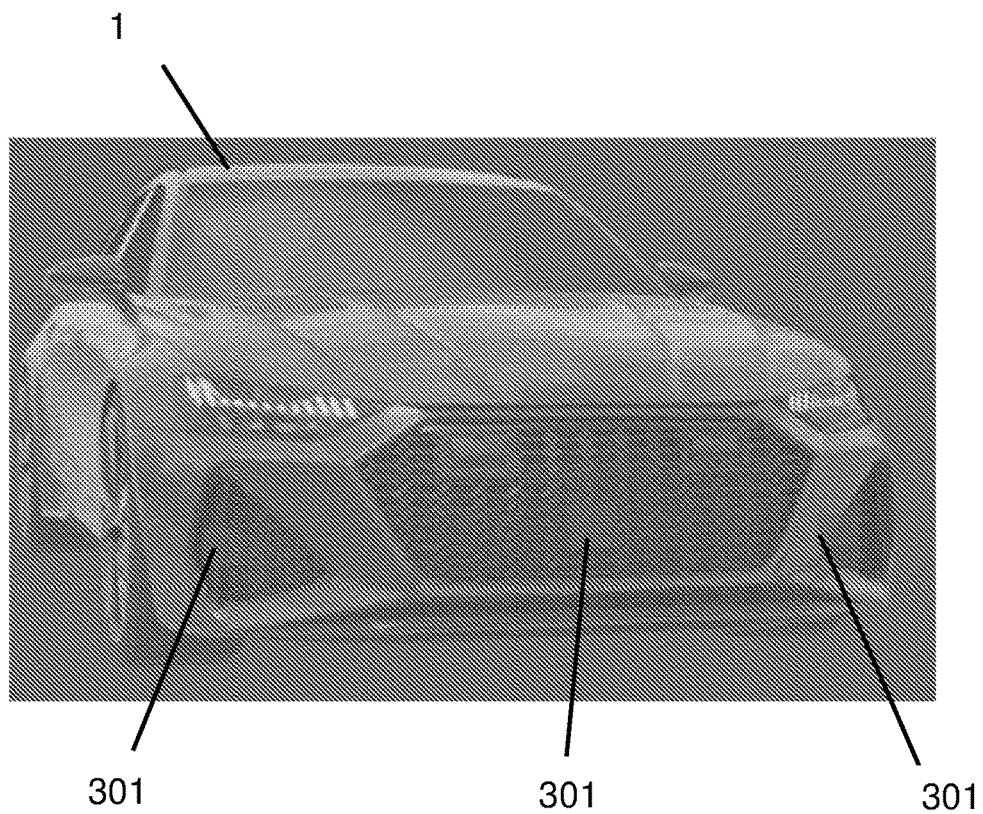
FIG. 3A shows possible storage locations of a vehicular pedestrian protection device in a vehicle's front, according to an embodiment of the invention.
Figure 3B:
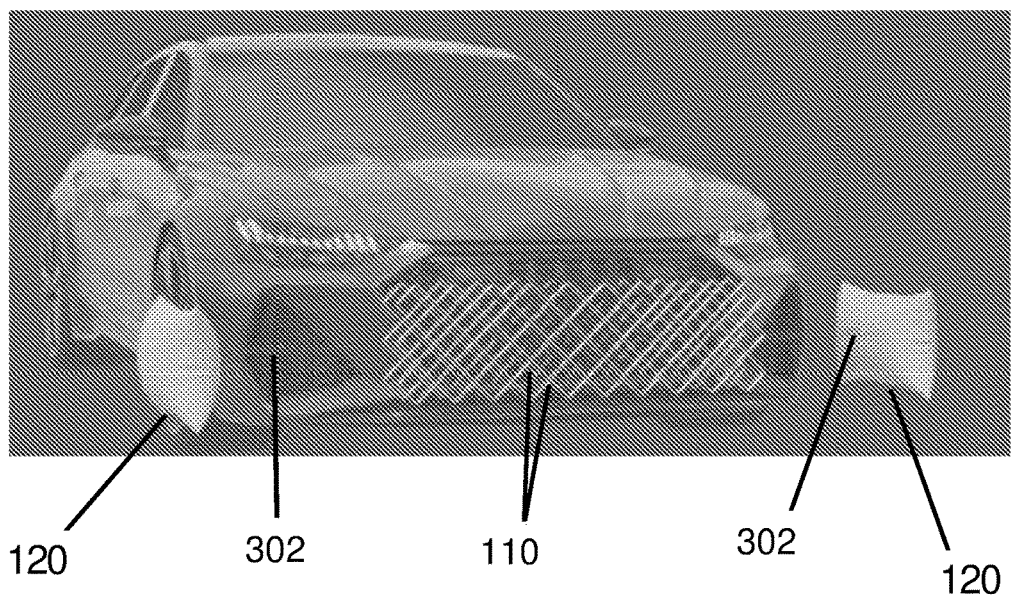
FIGS. 3B-3C schematically illustrate the deployment of the vehicular pedestrian protection device of FIG. 3A, according to an embodiment of the invention.
Figure 3C:
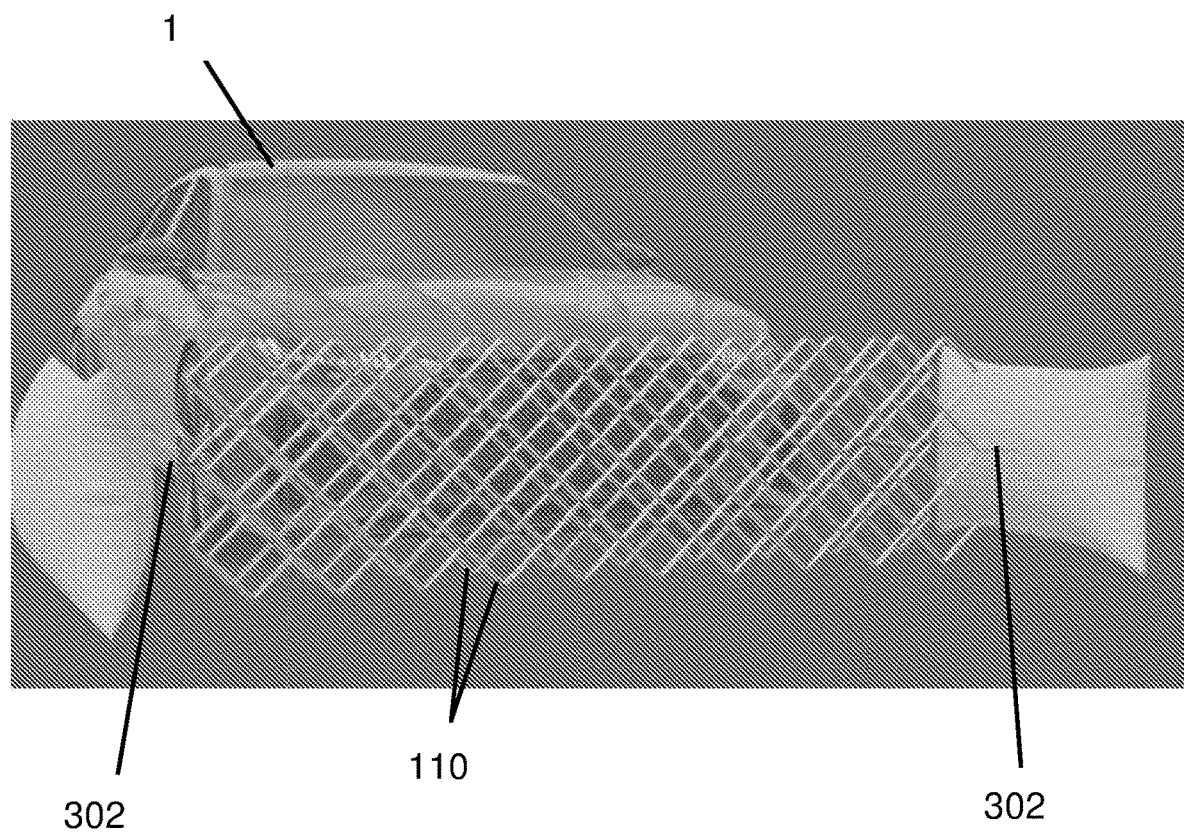

FIG. 3A shows possible storage locations 301 of device 100 in a vehicle's front, according to an embodiment of the invention. FIGS. 3B-3C schematically illustrate the deployment stages of device 100, according to an embodiment of the invention. Whereas device 100 receives an actuation signal (e.g., from a vehicular detection system), cushions 120 are triggered to inflate, thus forcing the breaking of the fender surface in locations 301, and the extension of device 100 forward (i.e., the deployment of mesh 110).

Further shown in FIG. 3B are pulling members 302 that connects inflatable cushions 120 to lateral extremities of meshes 110, thereby along with the inflation of cushions 120, meshes 110 extends laterally and vertically until its final deployment (FIG. 3C), in which it covers the entire front of vehicle 1.

Although embodiments of the invention have been described by way of illustration, it will be understood that the invention may be carried out with many variations, modifications, and adaptations, without exceeding the scope of the claims.

The invention claimed is:

1. A vehicular pedestrian protection device, comprising:
   a) at least one extendable impact suppression mesh adapted to be extended vertically and laterally; and
   b) one or more inflatable cushions anchored to said at least one extendable impact suppression mesh, for rapidly deploying said at least one extendable impact suppression mesh upon the inflation of said one or more inflatable cushions,
   wherein the at least one extendable impact suppression mesh comprises a plurality of hinged telescopic pillars, each of which comprises a plurality of substantially cylindrical concentric links.

2. The device according to claim 1, wherein the at least one extendable impact suppression mesh is adapted to extend out from a vehicle upon receiving an actuation signal, and wherein the received actuation signal triggers the one or more inflatable cushions to inflate and to pull said at least one extendable impact suppression mesh to deploy.

3. The device according to claim 1, wherein the cylindrical concentric links are arranged in a manner that enables them to retract and extend from each other, allowing the mesh to expand both vertically and laterally in a substantially parallel plane.

4. The device according to claim 1, wherein the cylindrical concentric links are equipped with an internal electromechanical concentricity sensing arrangement configured to enable the device to detect a collision and deploy the at least one extendable impact suppression mesh automatically.

5. The device according to claim 4, wherein the arrangement comprises an electrical circuit with contacts that are configured to disconnect when the links become eccentric to a predetermined extent, thereby enabling the device to detect a collision and deploy the mesh automatically, providing instant protection to the pedestrian.

6. The device according to claim 1, further comprising elastic studs that are adapted to interconnect two or more adjacent extendable impact suppression meshes to ensure a stable and flexible parallel formation.

7. The device according to claim 6, wherein the two or more adjacent extendable impact suppression meshes are adapted to be deployed in substantially parallel planes.

8. The device according to claim 1, wherein the at least one extendable impact suppression mesh is adapted to be stored folded in low-volume formation.

* * * * *